United States Patent
Segal

(10) Patent No.: US 10,057,542 B2
(45) Date of Patent: Aug. 21, 2018

(54) SYSTEM FOR IMMERSIVE TELEPRESENCE

(71) Applicant: Thereo LLC, New York, NY (US)

(72) Inventor: Edo Segal, New York, NY (US)

(*) Notice: Subject to any disclaimer, the term of this patent is extended or adjusted under 35 U.S.C. 154(b) by 0 days.

(21) Appl. No.: 14/828,042

(22) Filed: Aug. 17, 2015

(65) Prior Publication Data

US 2016/0050394 A1 Feb. 18, 2016

Related U.S. Application Data

(60) Provisional application No. 62/037,927, filed on Aug. 15, 2014.

(51) Int. Cl.
*H04N 7/14* (2006.01)
*H04N 7/15* (2006.01)
*H04L 12/18* (2006.01)

(52) U.S. Cl.
CPC ........... *H04N 7/15* (2013.01); *H04L 12/1822* (2013.01)

(58) Field of Classification Search
None
See application file for complete search history.

(56) References Cited

U.S. PATENT DOCUMENTS

| | | |
|---|---|---|
| 5,539,483 A | 7/1996 | Nalwa |
| 5,745,305 A | 4/1998 | Nalwa |
| 5,793,527 A | 8/1998 | Nalwa |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,145 A | 10/2000 | Nalwa |
| 6,144,501 A | 11/2000 | Nalwa |
| 6,195,204 B1 | 2/2001 | Nalwa |
| 6,219,090 B1 | 4/2001 | Nalwa |
| 6,285,365 B1 | 9/2001 | Nalwa |
| 6,356,397 B1 | 3/2002 | Nalwa |
| 6,700,711 B2 | 3/2004 | Nalwa |
| 2004/0008423 A1 | 1/2004 | Driscoll et al. |
| 2008/0263010 A1 | 10/2008 | Roychoudhuri et al. |
| 2009/0046139 A1* | 2/2009 | Cutler .................. H04N 7/15 348/14.08 |
| 2010/0228825 A1* | 9/2010 | Hegde ............... G06F 21/6218 709/204 |
| 2010/0259593 A1 | 10/2010 | Beers et al. |
| 2011/0249075 A1 | 10/2011 | Abuan et al. |
| 2011/0254912 A1* | 10/2011 | Mock ................. H04L 12/1818 348/14.03 |

(Continued)

OTHER PUBLICATIONS

"FullView: Technology." FullView: Technology. N.p., n.d. Web. Sep. 5, 2014.

(Continued)

*Primary Examiner* — Hemant Patel
(74) *Attorney, Agent, or Firm* — Leason Ellis LLP

(57) ABSTRACT

Disclosed is system and method for interactive telepresence that includes at least one data processing apparatus, at least one database, an audio/visual capture device that is configured with at least one microphone and camera. A detection module is provided to detect one of the plurality of participants who is speaking during the meeting, and a display module that is configured to display video that is generated.

18 Claims, 12 Drawing Sheets

(56) References Cited

U.S. PATENT DOCUMENTS

| | | | |
|---|---|---|---|
| 2011/0285807 A1* | 11/2011 | Feng | G06K 9/00228 |
| | | | 348/14.08 |
| 2012/0204119 A1 | 8/2012 | Lefar et al. | |
| 2013/0057639 A1* | 3/2013 | Ralston | H04L 12/1827 |
| | | | 348/14.02 |
| 2014/0139426 A1 | 5/2014 | Kryze et al. | |
| 2015/0149930 A1 | 5/2015 | Walkin et al. | |

OTHER PUBLICATIONS

"Welcome to RemoteReality." Welcome to RemoteReality. N.p., n.d. Web. Sep. 5, 2014.
"EyeSee360." EyeSee360. N.p., n.d. Web. Sep. 5, 2014.
"Centr Cameras." Centr Camera. N.p., n.d. Web. Sep. 5, 2014.
"Home." Altia Systems. N.p., n.d. Web. Sep. 5, 2014.
"Be Here Corporation Expands Mastery of VoIP Collaboration Through Award of 50th Patent for 360-Degree Imaging." PR Newswire. N.p., n.d. Web. Sep. 5, 2014. <http://www.prnewswire.com/news-releases/be-here-corporation-expands-mastery-of-voip-collaboration-through-award-of-50th-patent-for-360-degree-imaging-55422247.html>.
Mika Aikio & Bo Yang, "Omnidirectional Camera", 978-1-4799-1494-4/13, 2013, pp. 217-221.

\* cited by examiner 104 (OPERATED BY GUEST/ATTENDEE)

SYSTEM FOR IMMERSIVE TELEPRESENCE

CROSS-REFERENCE TO RELATED APPLICATION

This patent application is based on and claims priority to U.S. Provisional Patent Application Ser. No. 62/037,927, filed on Aug. 15, 2014, the entire contents of which is incorporated by reference herein as if expressly set forth in its respective entirety.

FIELD OF INVENTION

The present application relates, generally, to networking and, more particularly, to audio/visual collaboration for people to communicate and share information remotely.

BACKGROUND

Physical and virtual teleconferencing, such as provided by SKYPE, ADOBE CONNECT, WEB-EX, among others, continues to grow for participants who are located physically together and/or remotely, to collaborate in a meeting. Unfortunately, shortcomings exist, for example, due to high costs and/or low functionality.

BRIEF SUMMARY OF THE INVENTION

In accordance with one aspect of the invention, a system and method for providing an interactive telepresence are presented. In one or more implementations, at least one data processing apparatus is provided and configured by executing code that is stored on non-transitory processor readable media. Further, at least one database is provided that is accessible by the at least one data processing apparatus, wherein the at least one database includes meeting information representing at least a meeting, a date of the meeting and a plurality of participants who are scheduled to attend the meeting. Moreover, an audio/visual capture device that is configured with at least one microphone and camera is provided, and that is configured to communicate with the at least one data processing apparatus via a communication network. A detection module is included that is configured to detect, via audio input received by the audio/visual capture device, one of the plurality of participants who is speaking during the meeting. Moreover, a display module that is configured to display on at least one user computing device operated by at least one participant who is remotely located from the audio/visual capture device and/or a display device, video that is generated using output from the audio/visual capture device and that individually features the one of the plurality of participants.

These and other aspects, features, and advantages of the invention can be understood with reference to the following detailed description of the invention taken together with the accompanying drawing figures.

DETAILED DESCRIPTION OF EMBODIMENTS

By way of overview and introduction, the present application provides systems and methods for personal and/or professional collaboration. In one or more implementations, systems and methods shown and described herein support collaboration for a plurality of people who are physically located together (e.g., in the same room), as well as for people who are virtually together, such as by being remotely connected via the Internet or other communication network while physically located in different places. Rather than relying on a shared display device (e.g., a large monitor mounted on a wall) that displays and/or otherwise exhibits one or more people participating in a collaboration, the present patent application affords a "bring your own device" architecture, in which users can view each other, and create and/or share various content using their own respective mobile computing devices. For example, users use smartphones, tablet computers, laptop computers or the like to collaborate, including when they are physically located either together or apart. Mobile computing devices are ubiquitous and users have a high level of comfort when using their own devices, which provides a vast improvement over known physical and/or virtual collaboration that rely exclusively, for example, on a single wall-mounted display device.

Accordingly, in one or more implementations the present application supports sharing of video and meeting content wirelessly via a monitor or projector in a room. Teams are enabled to use large displays (e.g., rear projection displays, flat screen displays or the like) that may be located in a conference room, while enjoying wireless connectivity.

Various embodiments and aspects of the invention(s) are described with reference to details discussed below, and the accompanying drawings illustrate various implementations. The following description and corresponding drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
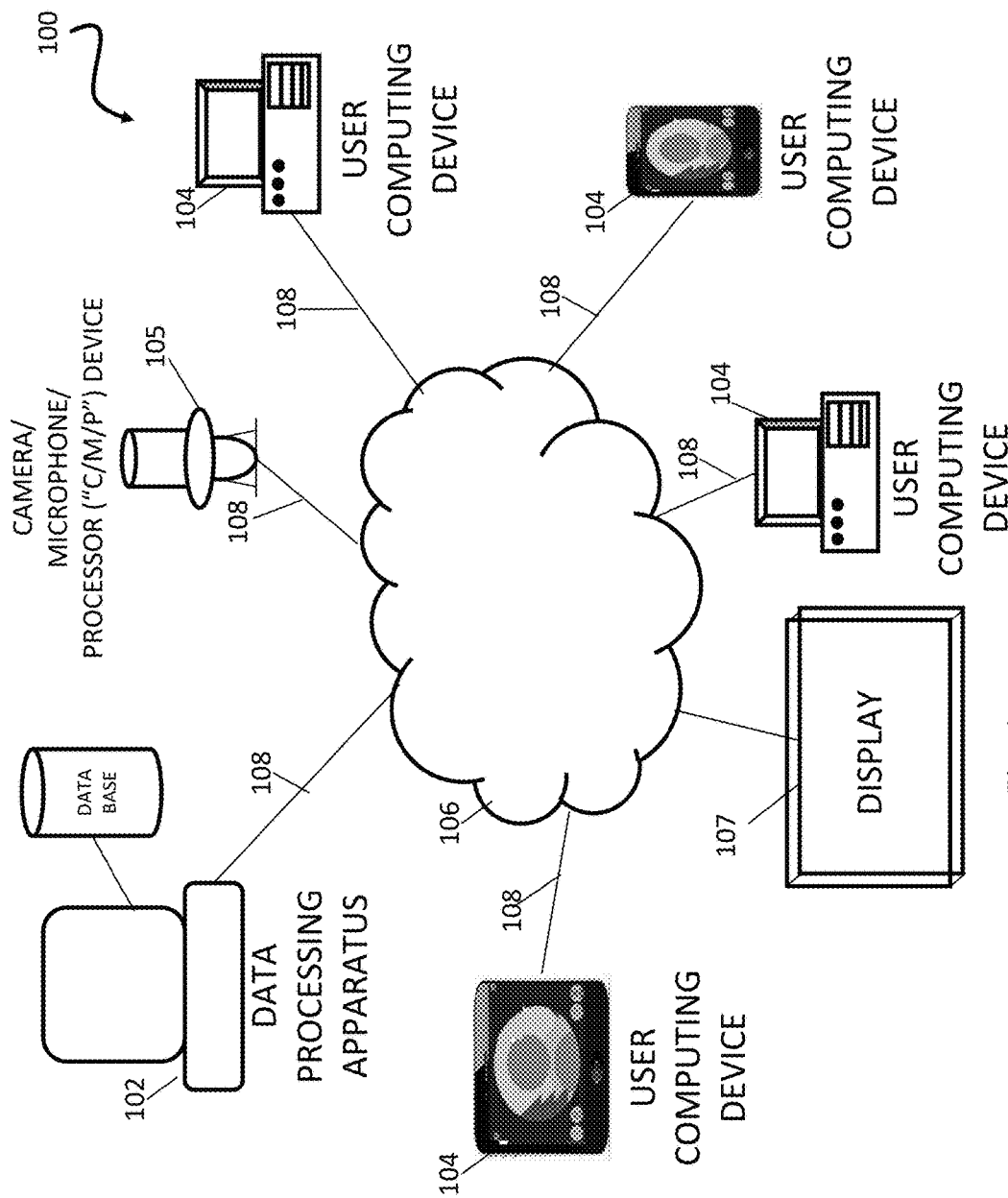
FIG. 1 is a diagram illustrating an example hardware arrangement that operates for providing the systems and methods disclosed herein.

Referring to the drawings, in which like reference numerals refer to like elements, there is shown in FIG. 1 a diagram of an example hardware arrangement that operates for providing the systems and methods disclosed herein, and designated generally as system 100. In the implementation shown in FIG. 1, system 100 includes one or more data processing apparatuses 102 that are at least communicatively coupled to one or more user computing devices 104 across communication network 106. User computing devices 104 can include, for example, mobile computing devices such as tablet computing devices, smartphones, personal digital assistants or the like, as well as laptop computers and/or desktop computers. In addition, an audio/visual capture device (camera/microphone/processor ("C/M/P") device 105) is depicted, which can be configured with at least a camera, a microphone, a microprocessor, and/or a communications array. The C/M/P device 105 can be configured with a high-quality embedded array microphone that enables a processor configured with the C/M/P device 105 and/or configured with a different device (e.g., a data processing apparatus 102) to locate a 3-dimensional source of audio. Once located, information can be processed by one or more hardware/software modules to determine who is speaking, and can isolate one or more sounds to provide high sound quality. Moreover, information can be generated and/or used by one or more hardware/software modules to capture and/or transmit images of the person speaking. In one or more implementations the C/M/P device 105 is rechargeable and battery operated, and also configured to operate via a power-plug.

In one or more implementations the camera is a unique single-image sensor 360-degree capture device which simultaneously captures multiple HD-quality video feeds of meeting participants. As noted herein, in one or more implementations, the audio/video capture device can also transmit graphics and video images wirelessly or via a wired connection to a monitor or projector located in the same room. Also illustrated in FIG. 1 is display 107, which can include an in-room monitor or projection system and that can be physically mounted and configured to receive content via a wired or wireless connection.

With continued reference to FIG. 1, data processing apparatus 102 can be configured to access one or more databases for the present invention, including image files, meeting content such as presentations, documents, audio/video recordings, metadata and other information. However, it is contemplated that data processing apparatus 102 can access any required databases via communication network 106 or any other communication network to which data processing apparatus 102 has access. Data processing apparatus 102 can communicate devices comprising databases using any known communication method, including a direct serial, parallel, universal serial bus ("USB") interface, or via a local or wide area network.

User computing devices 104 communicate with data processing apparatus(es) 102 using data connections 108, which are respectively coupled to communication network 106. Communication network 106 can be any data communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, applications, or other means, to display data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and wireless communication can be provided between wireless devices and data processing apparatus(es) 102. In one or more implementations, the present application provides improved processing techniques to prevent packet loss, to improve handling interruptions in communications, and other issues associated with wireless technology.

According to an implementation of the present application, user computing device 104 provides user access to data processing apparatus 102, device 105 and/or display 107 for various purposes, including to control applications associated therewith and for receiving and providing information. Various functionality provided by system 100 and, in particular, data processing apparatus(es) 102 and user computing device(s) 104 is described in detail below.

Devices included in system 100 can be configured with or access software that, when executed, causes the devices to provide functionality described in greater detail herein. Such software can reside on one or more data processing apparatuses 102, user computing devices 104 and/or other devices. One of the functions that can be performed by data processing apparatus 102 is that of operating as a server and/or a web site host. Data processing apparatus 102 typically communicates with communication network 106 across a permanent e.g., un-switched, data connection 108. Permanent connectivity ensures that access to data processing apparatuses 102 is always available.

Figure 2A:
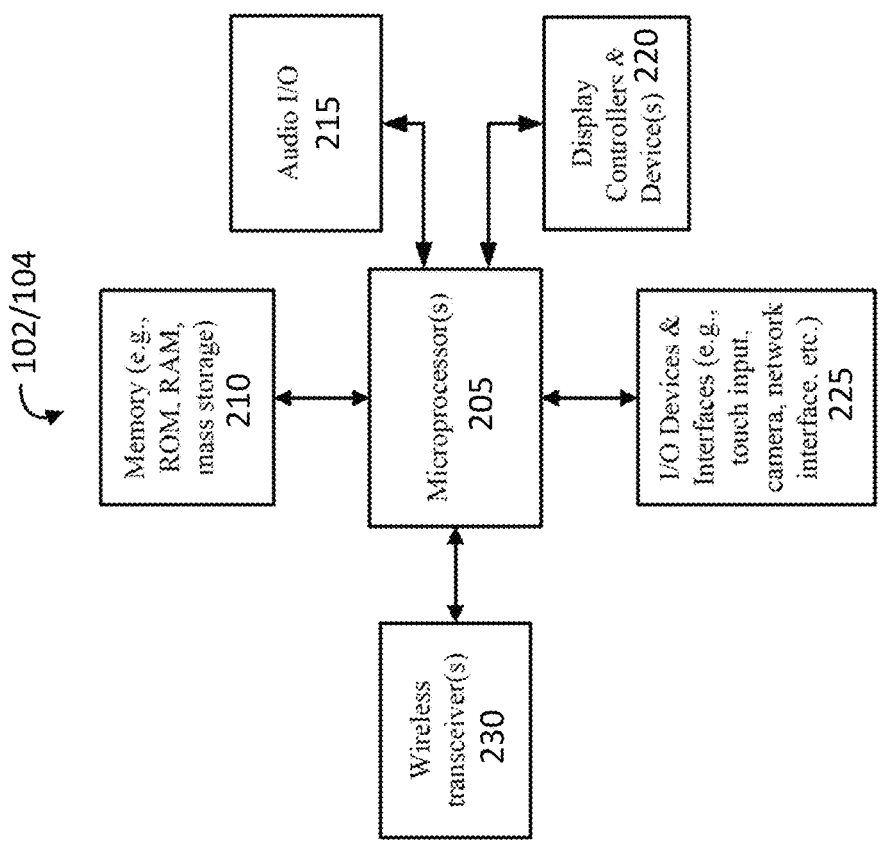
FIG. 2A is a block diagram that illustrates functional elements of a computing device in accordance with an implementation.

FIG. 2A illustrates, in block diagram form, features of an exemplary data processing device 102 and/or user computing device 104 that, in isolation or in combination, can provide functionality in accordance with interactive conferencing, as described herein. Although not expressly indicated, one or more features shown and described with reference with FIG. 2A can be included with or in the devices 105, 107 as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running iOS operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the system 100 with another device, external component, or a network.

Moreover, one or more buses can be used to interconnect the various components shown in FIG. 2A.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other implementations, the data processing apparatus 102 and/or user computing device 104 may be a network computer or an embedded processing device within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

It will be appreciated that additional components, not shown, may also be part of the data processing apparatus 102 and/or user computing device 104, and, in certain implementations, fewer components than that shown in FIG. 2A may also be used in data processing apparatus 102 and/or user computing device 104. Furthermore, and as described herein, computer-implemented methods may be carried out in a computer or other data processing system in response to its processor or processing system executing sequences of instructions contained in a memory, such as memory 210 or other machine-readable storage medium. The software may further be transmitted or received over a network (not shown) via a network interface device 225. In various implementations, hardwired circuitry may be used in combination with the software instructions to implement the present implementations. Thus, the techniques are not limited to any specific combination of hardware circuitry and software, or to any particular source for the instructions executed by the data processing apparatus 102 and/or user computing device 104.

Figure 2B:
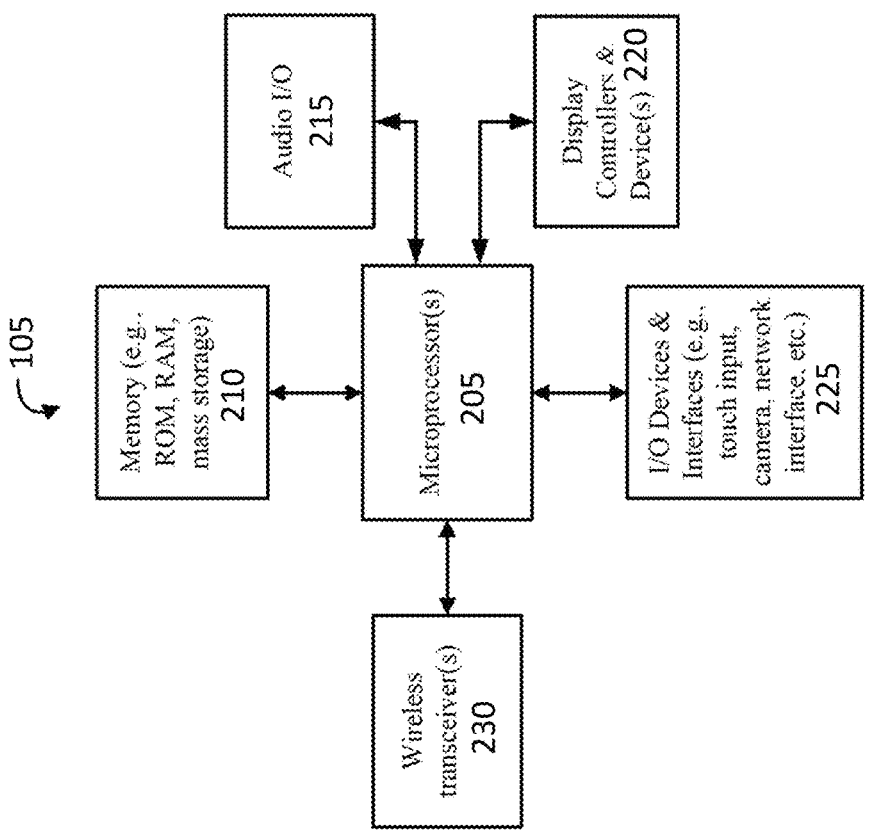
FIG. 2B is a block diagram that illustrates functional elements of an audio/visual capture device in accordance with an implementation.

FIG. 2B illustrates, in block diagram form, elements associated with an exemplary C/M/P device 105 that can provide functionality in accordance with interactive conferencing, as described herein. C/M/P device 105 can include one or more microprocessors 205 and connected system components (e.g., multiple connected chips) may be a system on a chip. A video subsystem can be configured within C/M/P device 105 as a single-chip multiple-HD 360-degree camera (and optionally a 3D-360 degree camera, including providing 4K output). In one or more implementations, the audio input can be configured as an array microphone. In one or more implementations, one single camera sensor and lens can be mounted to obtain 360-degree video.

In one or more implementations, the present application includes a high performing, low cost, and miniaturized 360 degree camera. In one or more implementations, the optical performance of the 360 degree camera supports a high range of f-stop values, and is capable of providing a high object resolution and large depth of field, including at a long distance (e.g., 10 meters), while maintaining good uniformity of other optical parameters. Further, the optics, electronics and/or software can provide for good low-light performance at high frame rate (e.g., >15 fps), and also can provide for excellent color and contrast (e.g., as reflected by modular transfer function (MTF) values).

In addition, the system 100 can include one or more software modules that, when executed by a processor, can configure the processor to detect features, such as face contours or other physical characteristics of a person detected as currently speaking. Once detected, zooming functionality can be applied to isolate the person, visually and/or audibly. Appropriate zooming functionality may depend, for example, on the distance of the participants from the device.

In addition, the system 100 can include imaging software that, when executed by a processor, configure the processor to instruct and configure the processor to de-warp an image from the optical subsystem. For example, an image may be warped due to optical constraints, such as from a fish-eye lens. Further, the present application can be configured to process a panoramic image from one or more image files substantially in real-time on a relatively low-cost processor to provide a high-quality optical appearance.

In one or more implementations, a camera module provided in accordance with the present application can include a three-dimensional ("3D") component that employs a structured light, stereo camera, micro array, and/or time-of-flight approach, so that the images collected are provided in both color and 3D. User computing devices, such as mobile computing devices (e.g., smart phones, tablet computers, laptop computers or the like) can provide additional processing and display one or more features to support consumer-level 3D and 360 degree views. In one or more implementations, this is accomplished by combining a fish-eye lens with an omnidirectional lens.

As shown and described herein, system 100 supports wired and/or wireless connectivity, for example, for user computing devices 104 to connect to data processing apparatus 102, as well as one or more external display devices (such as an LED, LCD or CRT conference-room TV). In one or more implementations, the data processing apparatus 102 is configured as a server computing device and is "cloud-based" (e.g., accessible via communication network 106) and the C/M/P device 105 is configured to beam wirelessly to one or more external display devices. In one or more implementations, the C/M/P device 105 is configured to connect to an external display device over a wireless high-definition multimedia interface ("HDMI") dongle or existing wireless video standard such as ChromeCast, Miracast, or AirPlay, thereby eliminating need for a separate computing device, such as a desktop computer or other device. Moreover, the C/M/P device 105 is configured to connect to a local area network and/or wide area network, for example via Wi-Fi and/or cellular connectivity. In one or more implementations, user computing devices 104 are operable to communicate with the C/M/P device 105 via BLU-ETOOTH connectivity, thereby enabling one or more computing devices 104 to control the C/M/P device 105. In addition, connectivity between the C/M/P device 105 and one or more computing devices may be provided via wired connection, such as Ethernet, USB or other suitable wired connection.

In one or more implementations of the present application, software and hardware communication modules are provided that interface with one or more processors and transmit and/or receive content, including via one or more respective communication devices. For example, one or more respective user computing devices 104 transmit content from a PC, smartphone, tablet, or other computing device directly, which is received and displayable, for example, on each of the user computing devices 104 and/or an external display 107, such as in a conference room.

The present application can also include hardware and/or software modules that configure one or more processing devices for low cost voice over Internet Protocol ("VoIP") communications. Using VoIP, users can communicate using by voice using their computing devices 104, in addition to or in lieu of a cellular or public switched telephone network. Software modules may also configure one or more processors to "intelligently" select one or more video streams for transmission, for example, based on a detection of which party is talking or otherwise "has the floor." By selecting a respective video stream in this way minimizes network traffic while simultaneously maximizing performance/visual quality.

The present application can also provide a solution to handling disconnections and/or other failures. This addresses a shortcoming problem in the event that, for example, before, after or during a conference, someone physically disconnects an audio/visual device (e.g., a camera/microphone) from a computer or other device that is required for on-line conferencing. In one or more implementations, the C/M/P device 105 is configured with software to enables detection of one or more disconnected components. If disconnected, the C/M/P device 105 can notify a party (e.g. an administrative assistant) that it is disconnected so that it can be reconnected. This avoids the inconvenience of showing up to a meeting only to spend the first 15 minutes trying to reconnect the conferencing system.

In one or more implementations, the present application is configured with one or more modules for enabling location awareness. For example, the C/M/P device 105 can be configured with a (e.g., built-in) global positioning system ("GPS") chipset, or other location-based service hardware or software technology, including but not limited to BLU-ETOOTH. Location awareness is usable in conjunction with one or more participants' user computing devices 104 and enables the C/M/P device 105, user computing 104 and/or data processing apparatus 102 to determine who is virtually or physically in attendance, such that participants can be specifically asked to attend. Alternatively, contextual message can be transmitted to devices 104 of those who in are attendance such as, "thank you for joining the conference, please wait one moment." In addition to location, other forms of "awareness" are supported by the present application, including as a function of one or more sensing devices and that include light, motion, presence and temperature.

In accordance with one or more implementations, a "smart user interface" can be included and operable to efficiently make use of limited screen space on mobile devices 104. For example and for users of devices 104 who are present (e.g., in the conference room), a remote participant's face may appear on an external display TV 107 (e.g., in the conference room), but not on the mobile devices 104. This avoids redundancy and eliminates a need to display a person's face on the display device 107 and on user computing devices 104 that are present with display device 107. On the other hand, a user computing device 104 that is operated by a participant who is not physically in a meeting room (i.e., a "remote participant) can display another participant's face because the C/M/P device 105 (or other computing device, e.g., device 102 or 104) has determined that the remote participant is not physically present in the main meeting room with the external device 107 (e.g., the TV).

Figure 3:
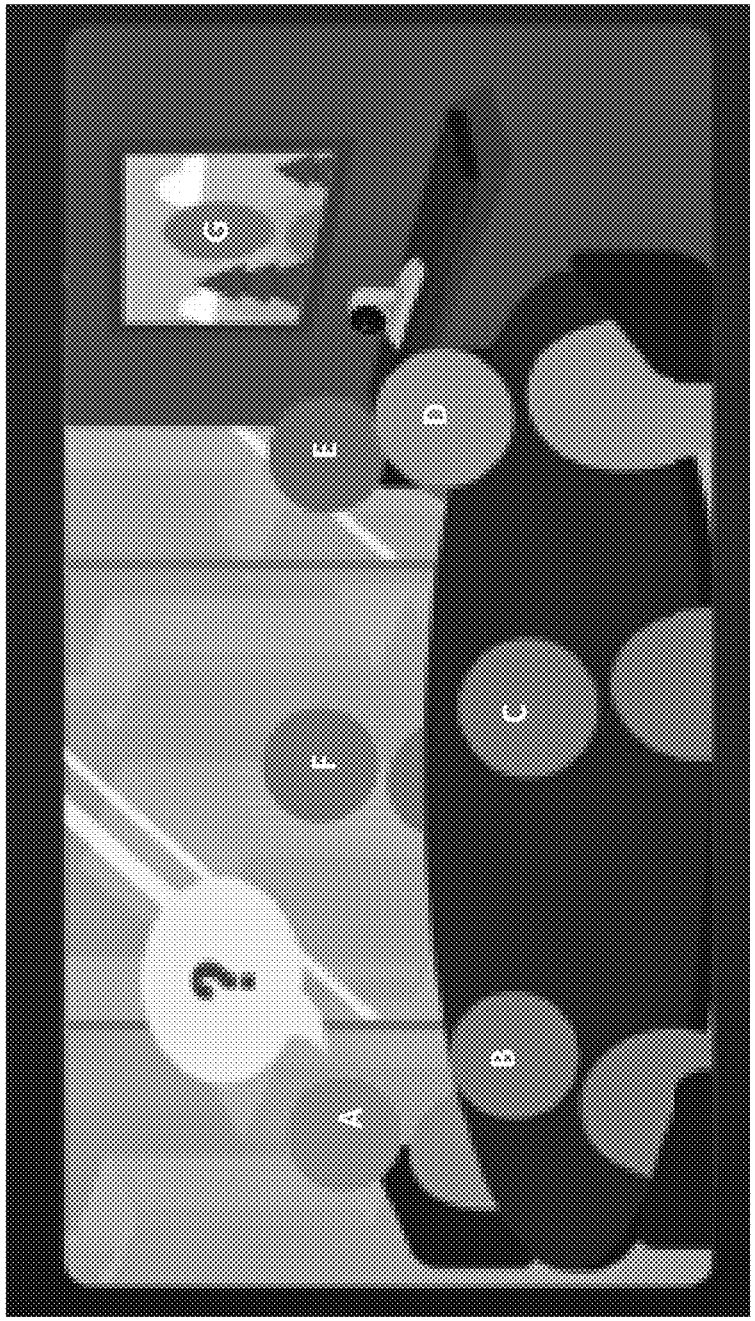
FIG. 3 is diagram that illustrates an example prior art conference taking place that includes a camera that is located at the end of a conference room.

FIG. 3 is a simple block diagram that illustrates an example prior art conference room including a camera that is located at one end of the room, and a singled shared external display that displays remote participants and/or participants who are physically present. In the example shown in FIG. 3, seven participants are shown, and six of the participants (designated as persons A, B, C, D, E and F) are physically together in the same room, while participant G is located remotely. Participant G is displayed on the external monitor that is mounted on a wall and positioned near the one camera at the end of the room. One or more cameras that are positioned outside of the experience (e.g., at the end of the table), can result in an attendee feeling like an outsider, which makes it difficult or unpleasant to participate.

Figure 4:
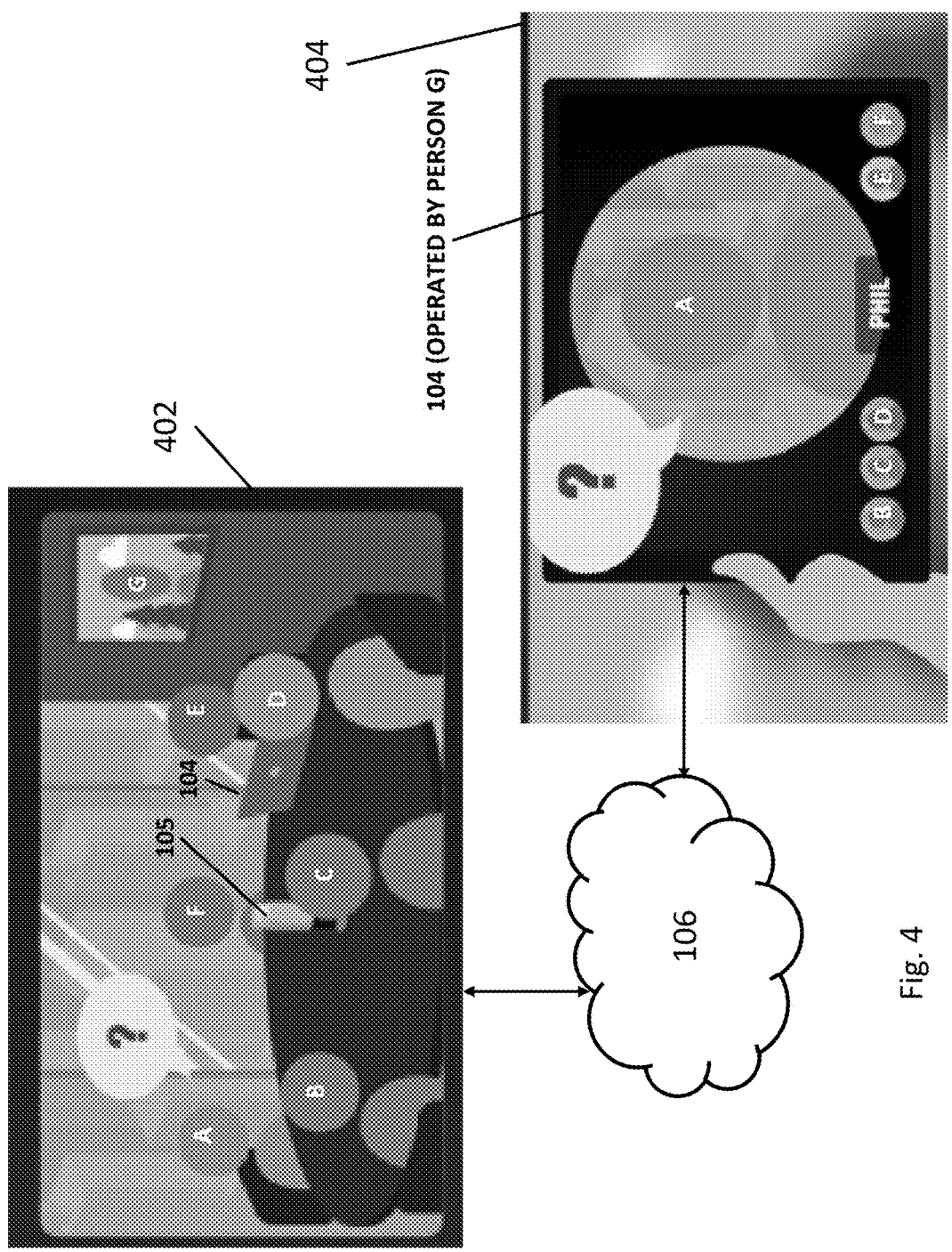
FIG. 4 is a diagram illustrating a conference room configured with an audio/visual capture device in accordance with an example implementation of the present application.

FIG. 4 is a diagram illustrating a conference room 402 that is configured with the C/M/P device 105 positioned near the center of a conference table, which enables remote participants to see each participant "face on" providing a better experience than that illustrated in FIG. 3. In one or more implementations, the C/M/P device 105 provides for high quality and directed audio/video capture, including as a function of a 360 degree field of view and audio detection. In addition to improving the visual experience for participants, an array microphone provided with the C/M/P device 105 can be configured to transmit a respective voice of each participant who is physically present (e.g., participants A-F) very clearly.

Moreover, FIG. 4 illustrates an example display screen on a user computing device 104 operated by a participant (Person G) (404). In the example shown in FIG. 4, person A is isolated and identified (zoomed-in, as described herein), such as for asking a question, and the remaining participants, B, C, D, E and F are also shown in smaller portions of the display. System 100 can include one or more software/hardware modules to automatically (or substantially automatically) use audio location information, in combination with visual content from video (cues from a real-time video image), to isolate an individual person who is speaking and highlight that person on one or more display screen(s). In this way, an individual stream may be transmitted, which improves system performance and reduces load/cost. This is further illustrated in FIG. 4, in which a user computing device 104 operated by person G displays person A, who is asking a question (represented by a question mark). Person A is determined by a processor configured in accordance with the teachings herein to be speaking, and one or more modules operating on the C/M/P device 105, one or more respective user computing devices 104 and/or data processing device 102 cause person A to be displayed on at least one user computing device 104.

Figure 5A:
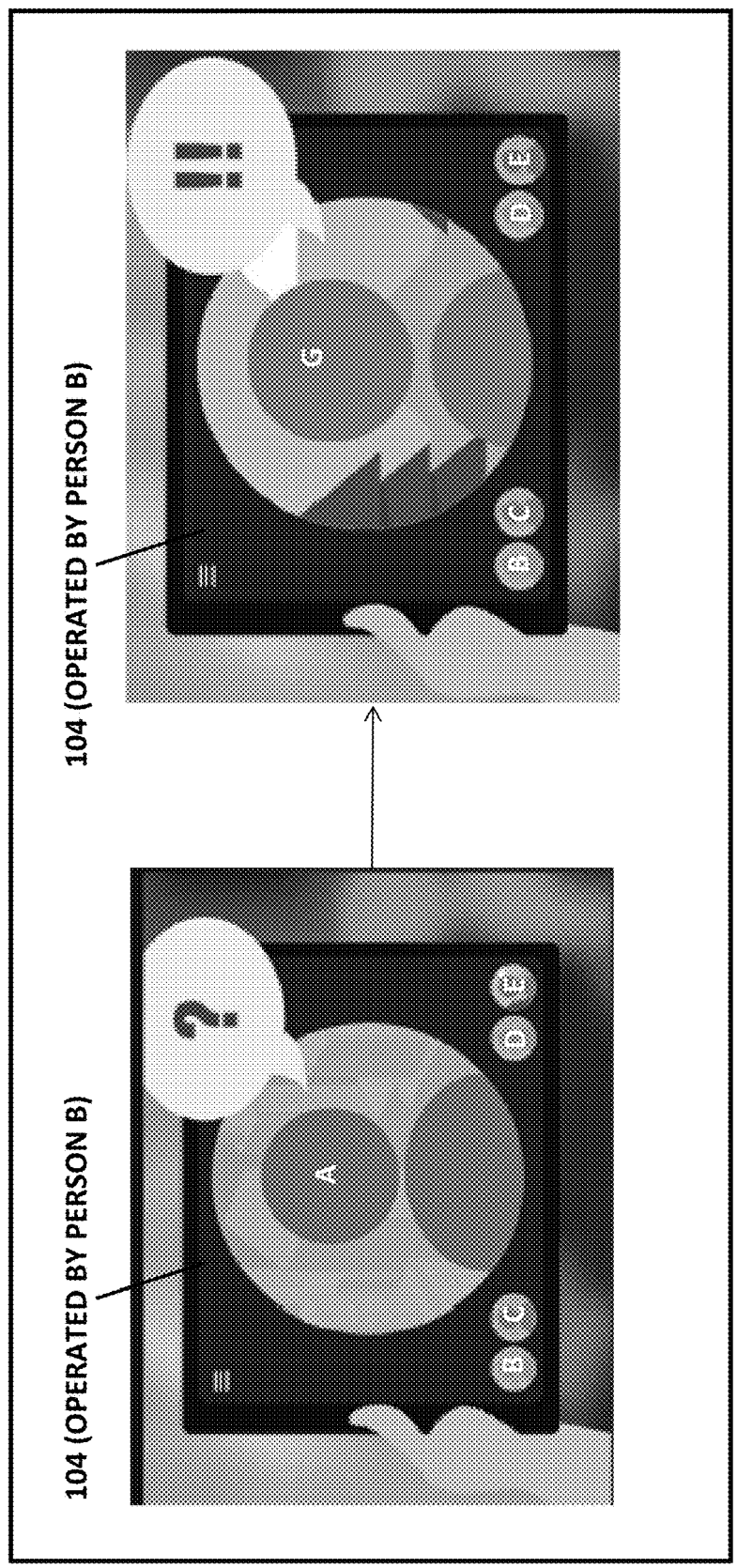
FIG. 5A illustrates an example implementation of the present application in which user computing device displays a person asking a question, and then changes to display another person shown speaking.
Figure 5B:
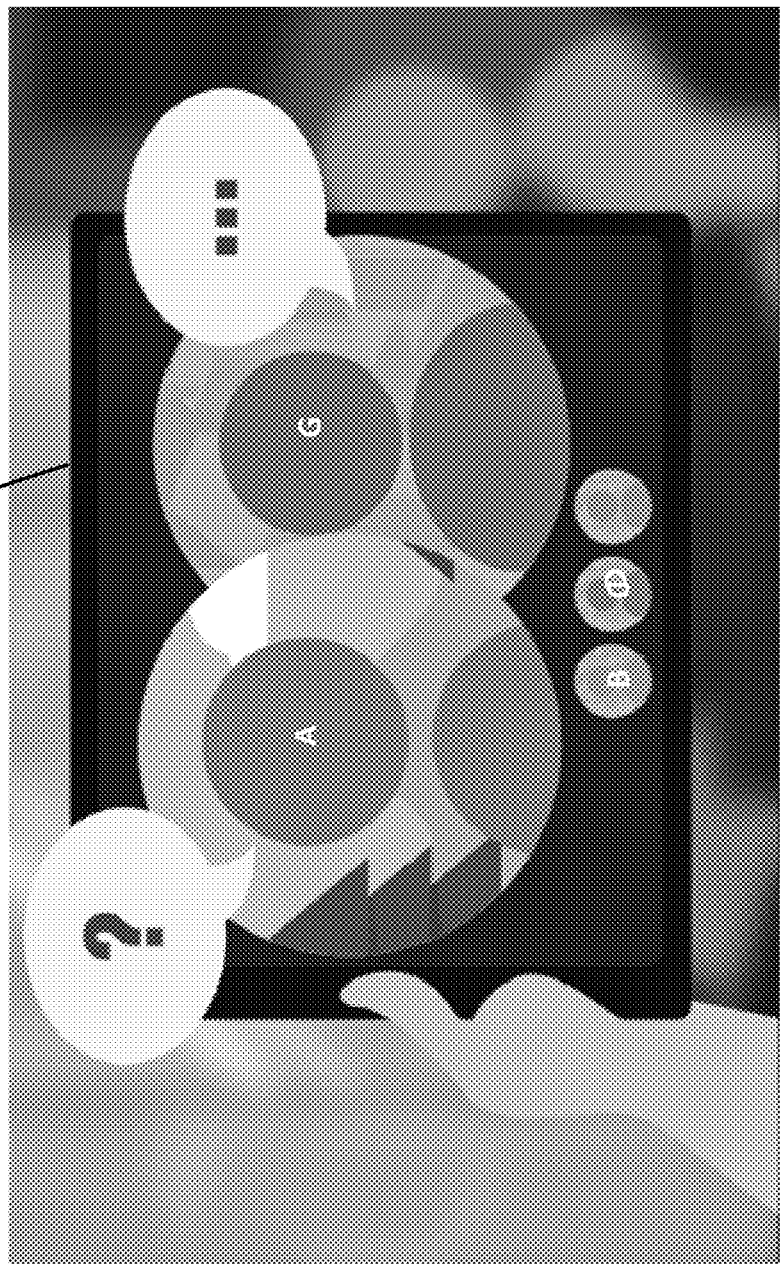
FIG. 5B illustrates an implementation showing two users speaking in a side-by-side display on a user computing device.

In addition to isolating one individual participant, the present application is configured to identify and/or isolate two or more of a plurality of participants. The two or more of the plurality of participants can be shown together instead of being shown in isolation (e.g., sequentially). For example, two or more people are speaking at a given time and hardware/software module(s) are configured to identify the two people and to cause user computing devices 104 to display both speaking people on-screen simultaneously. FIG. 5A illustrates an implementation of the present application in which user computing device 104 operated by a single person (person B) displays person A asking a question, and then the display changes and person G is shown speaking (e.g., answering the question posed by person A). FIG. 5B illustrates an improved implementation showing both users (A and G) speaking in a side-by-side display on user computing device 104 operated by person B. This eliminates the display switching back and forth between the two people, which is disruptive and compounded as more individuals participate in a conversation. Switching often occurs so quickly that participants are unable to follow the conversation, as a quick back-and-forth with constantly cutting cameras during a discussion can be particularly jarring. The present application provides a naturally appearing conversation and creates a view that lets each participant enjoy a wide angle of view, and/or a contextual view of two or more speaking participants. The present application ensures that two or more persons who are speaking (including at the same time) appear together on a display provided with user computing device 104.

In one or more implementations, the system 100 can include one or more software and/or hardware modules that support remote "pan and zoom" as well as automatic computer-controlled "pan and zoom." For example, embedded software combined with the multi-dimensional camera enable each participant of the meeting to have different and respective visual perspectives. For example, Jane is giving a presentation to people including Bob, Frank, John, and Sandy, around a conference table in New York City. Jim is participating in the conference remotely from Miami, Fla. using a configured user computing device 104, and Edo is participating remotely from Los Angeles, Calif. using a configured user computing device 104. By default, Jim and Edo both see Jane as the presenter. However, Jim is interested to see how Bob is reacting to Jane's presentation and Edo is interested to see how Frank is reacting to Jane's presentation. Each of Jim and Edo can respectively select persons (e.g., via an icon or other function on screen) and have a totally different view of the meeting, simultaneously. This provides a virtual experience, as if Jim and Edo were physical present in the conference room and Jim was looking at Bob and Edo was looking at Frank.

As noted herein, the C/M/P device 105 can be configured with a plurality of hardware and software modules. In one or more implementations, the C/M/P device 105 can be configured for communication that is accessible via, for example, POP, IMAP, SMTP, MAPI or other suitable protocol. In addition to email correspondence, calendar and other functionality provided by a personal information manager, such as MICROSOFT OUTLOOK, MOZILLA THUNDERBIRD, GOOGLE CALENDAR, ZIMBRA DESKTOP, can be provided with C/M/P device 105. In one or more implementations, a user can set up a new meeting simply by using calendar/e-mail functionality to invite the C/M/P device 105 to the meeting.

Figure 6A:
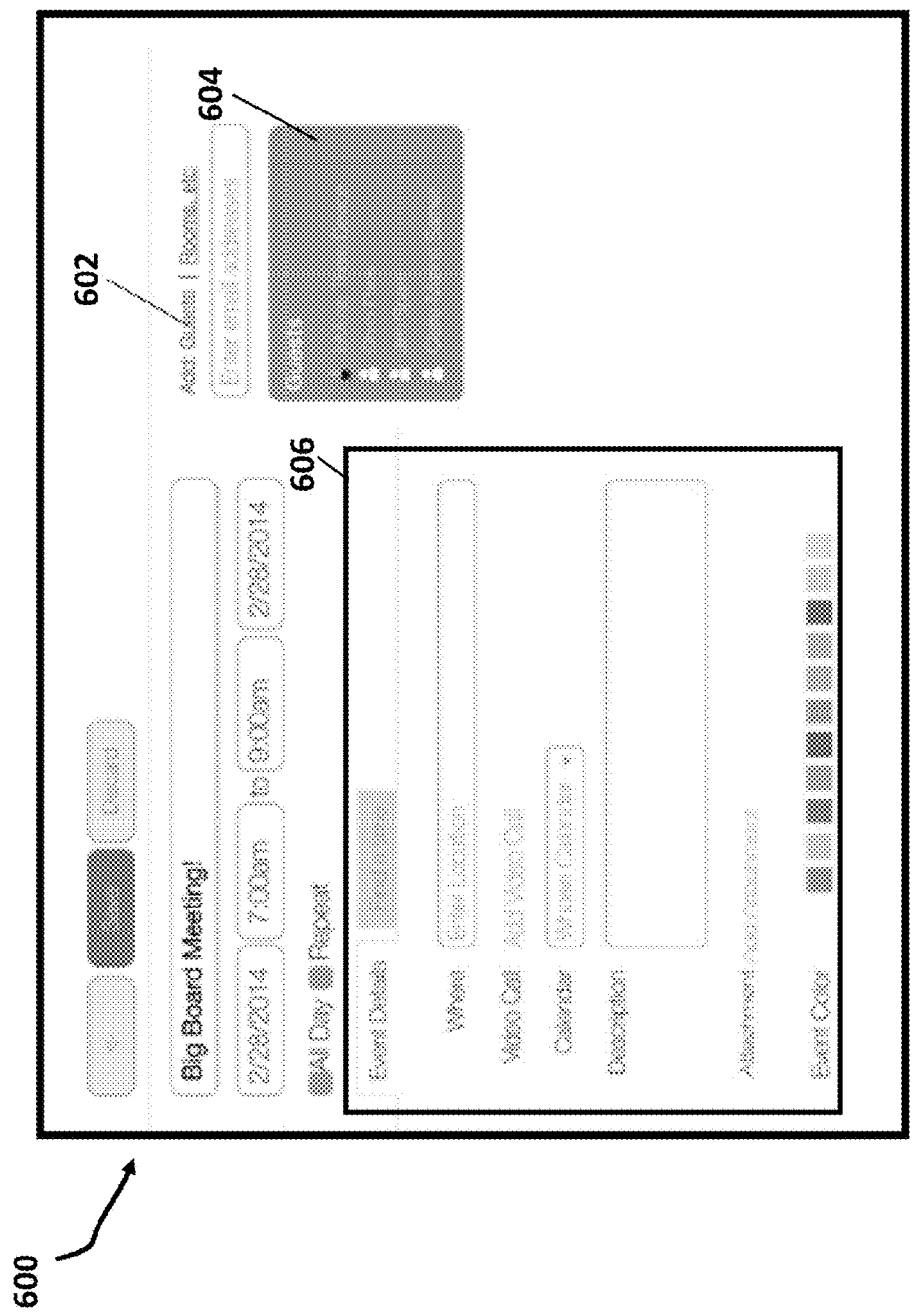
FIG. 6A illustrates an example display screen that is displayed on a user computing device that includes graphical screen controls that are usable for setting up a new meeting.

FIG. 6A illustrates an example data entry display screen 600 that is displayable on a user computing device 104, data processing apparatus 102 or other suitable device, and that includes graphical screen controls that are usable for scheduling and configuring a new meeting. As shown in FIG. 6A, graphical screen controls are provided for a user to set a starting date/time, ending date/time, to schedule a meeting as an all-day event, and to define the meeting to recur or repeat (such as daily, weekly, monthly, etc.). Once received, the C/M/P device 105 is configured with date and time information when the meeting is scheduled. Moreover and as illustrated in FIG. 6A, Add Guests control 602 is usable to invite attendees to a meeting; Guests List section 604 displays a list of guests that have been invited and/or added to a conference meeting; and Event Details section 606 includes data entry and graphical screen controls for setting and/or displaying a meeting location, video call information, calendar details, meeting description, and adding/removing attachments. Furthermore, controls are provided for formatting information associated with the meeting event in a respective color. Other options are supported (though not necessarily illustrated), such as to send custom messages to attendees, to alert supervisors or other authorized personnel of the scheduled meeting.

Figure 6B:
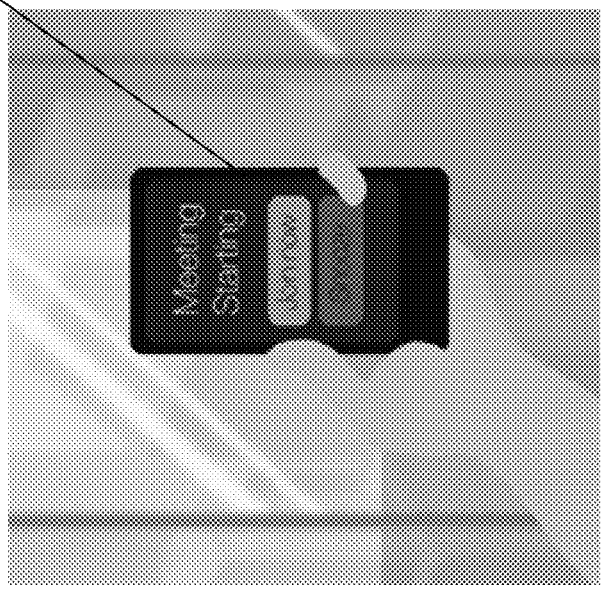
FIG. 6B illustrates an example display provided on a user computing device alerting a user to a meeting.

Once saved, information can be transmitted to various computing devices 104, including, for example, devices 104 that are operated by or associated with guests/attendees of the meeting. FIG. 6B illustrates an example display screen provided with user computing device 104 that alerts a user that a meeting is starting and prompting the user to join the meeting or delay ("snooze") the alert for a short period of time. Notifications can be transmitted, (e.g. by SMS, MMS, web notification, email, phone call, or other suitable way) to the invited participants to send alerts, or other notifications can be provided, such as to schedule a conference well in advance to ensure the participants are available.

Figure 7:
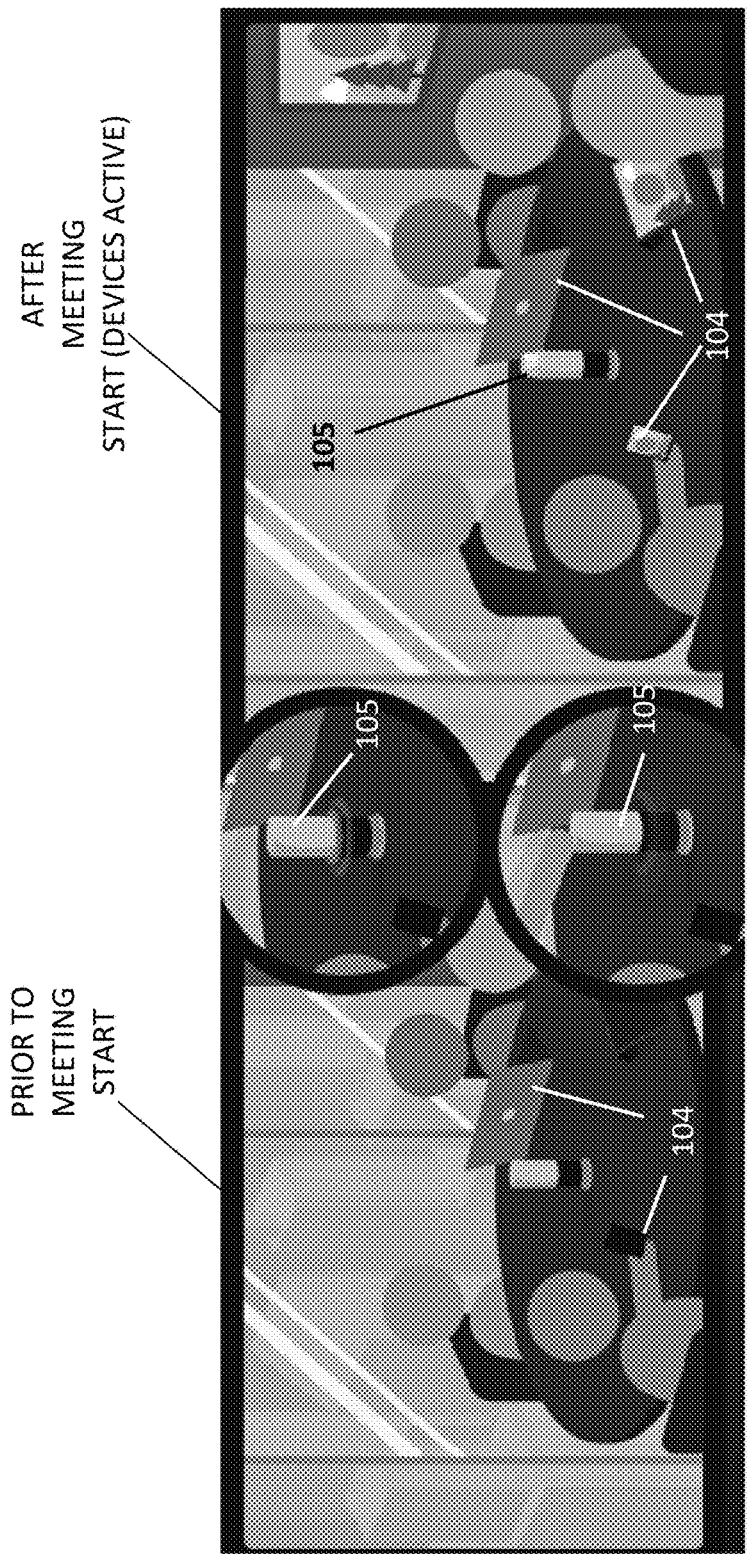
FIG. 7 is a diagram of a conference and illustrates two states of devices, both prior to a meeting start (inactive) and after a meeting starts (active)

In one or more implementations, the C/M/P device 105 is configured with one or more output elements, such as lighting or audible elements which can light and/or sound an audio alarm, that can prompt a user to take some action such as to start a meeting or inform a user that a meeting has started. In one or more implementations, the C/M/P device 105 can be configured with an option, such as a software control (e.g., a button, checkbox or other graphical screen control), that can receive user input (e.g., in response to the lighting or audible). FIG. 7 is a diagram of a conference room and illustrates two states of devices 104 and 105, both prior to a meeting start (inactive) and after a meeting starts (active).

Figure 8:
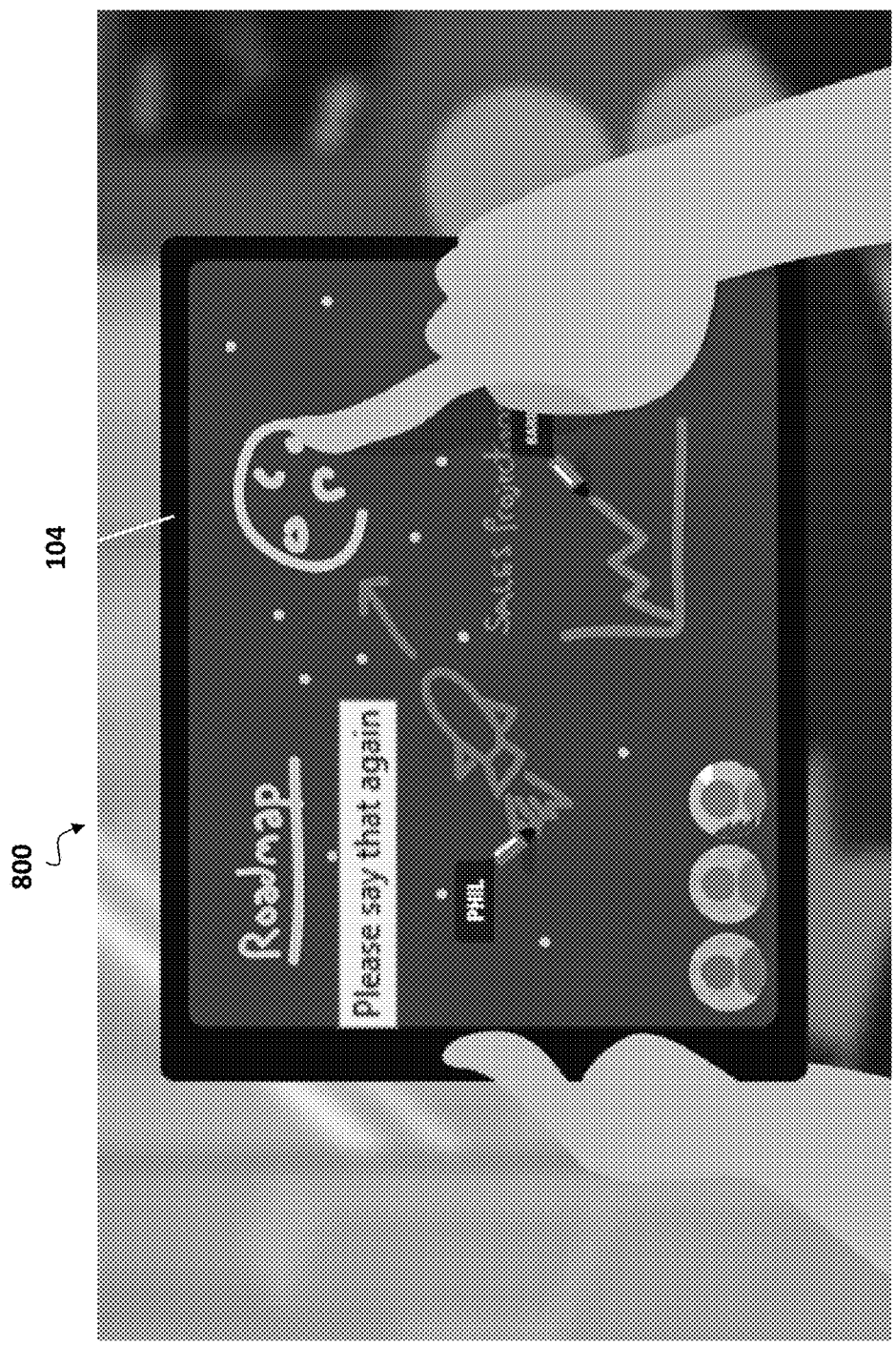
FIG. 8 illustrates example functionality provided by one or more modules operating on a user computing device that support sharing of a virtual whiteboard for users to collaborate.

Furthermore, in one or more implementations, one or more modules are configured for meeting canvas and recording. FIG. 8 illustrates an example display screen 800 provided in connection with a user computing device 104, which in the example shown in FIG. 8 is a tablet computer. Display screen 800 includes example functionality provided by one or more modules that support sharing of a virtual whiteboard for users to collaborate. For example, a user can draw ideas and add them to a meeting. Further, functionality is provided for someone to copy and/edit (e.g., add/change/delete) another's person's whiteboard contents. In the example shown in FIG. 8, a digital whiteboard is provided via user computing device 104 in which a participant is drawing, for example, in a collaborative fashion. In one or more implementations, as one person draws on his/her user computing device 104, the content is provided on all user computing devices 104 substantially in real time. In addition (or in the alternative), the present application supports a person sketching in isolation and completing the process of preparing content, prior to sharing the content with a group. Also as illustrated in FIG. 8, content from two respective participants is illustrated (Phil is asking for something to be repeated), thereby depicting the ability to share and modify content from a plurality of participants substantially in real time.

Thus and as shown and described herein, content that is provided via one or more user computing devices 104 during a collaboration is saved and can be distributed after the meeting. For example, audio/video and other content that is shared throughout a meeting, such as meeting notes, documents, drawings, videos, presentations, whiteboard content, can be shared and later accessed and/or distributed. In one or more implementations, content and other information can be hyperlinked into a "canvas," such that a participant can refer to points or pieces of content in the meeting that may have missed. For example, a person can simply click on a sentence in stored meeting notes and be presented with the audio/video from the corresponding part of the meeting. The recording and content can be stored locally or remotely, such as in the cloud.

In one or more implementations, an archive module is provided that is configured to transmit and/or store an archive of a meeting after the meeting is complete. For example, information associated with the archive (including a video archive of the meeting) can be transmitted to respective computing devices 104 associated with each of the plurality of participants. The archive can include an audio recording of the meeting, hyperlinks to content that was shown or discussed during the meeting, and/or a text transcript of the meeting.

In addition (or in the alternative), information associated with the archive can be transmitted to a file storage service, such as DROPBOX or other suitable on-line storage. Moreover, an integration module can be provided with the archive module that is configured to integrate records associated with the archive with at least one software productivity application. For example, the software productive application can include a customer relationship management application, a customer service software application, a notetaking software application, a project management software application and a file hosting service.

In one or more implementations, a virtual keyboard can be provided to receive input from a user. For example, a laser projection is provided that displays a keyboard and/or touchpad, for example, on a surface. The virtual keyboard can be provided as a module included with the C/M/P device 105, thereby enabling additional input to be received from a user in close proximity to device 105. Alternatively, a keyboard module can be provided as an accessory to the C/M/P device 105.

In addition, the present application can be configured with one or more modules for providing a smart agent meeting "concierge." For example, a voice-based, text-based, instant messaging-based, and/or software-controlled real-time artificial intelligence agent (e.g., network service) can be provided as a function of one or more hardware/software modules that enables a number of "knowledge management" features before, during and after the meeting. In one or more implementations, administrative control is supported and the service can be used to contact someone who is missing or otherwise not present. For example, a participant could instruct the system to locate someone, John Doe, and connect him to the conference. Once the instruction is received (including when the instruction is configured as a simple plain language voice command), the smart agent can operate to look up and contact John Doe and bring him in to the meeting. In another example, additional content (e.g., located via an Internet connection) can be accessed using the smart agent. For example, during a meeting a user can simply say "please bring up the web page for The White House" and the smart agent will search, acquire, properly format, and display the website that is requested. The service can also be used for maps, pulling up database records of any kind (customer service, financial, etc.), documents, images, audio content, or the like.

In one or more implementations, the C/M/P device 105 can be configured with a holographic display that extends from the device and includes a proprietary synchronized-point-of-view technology that effectively shows a hologram of a remote participant in the device, such that each conference participant has the feeling that the remote participant is physically present and looking at them. The C/M/P device 105 can be configured to contain a micro projector to project its own screen.

Figure 9:
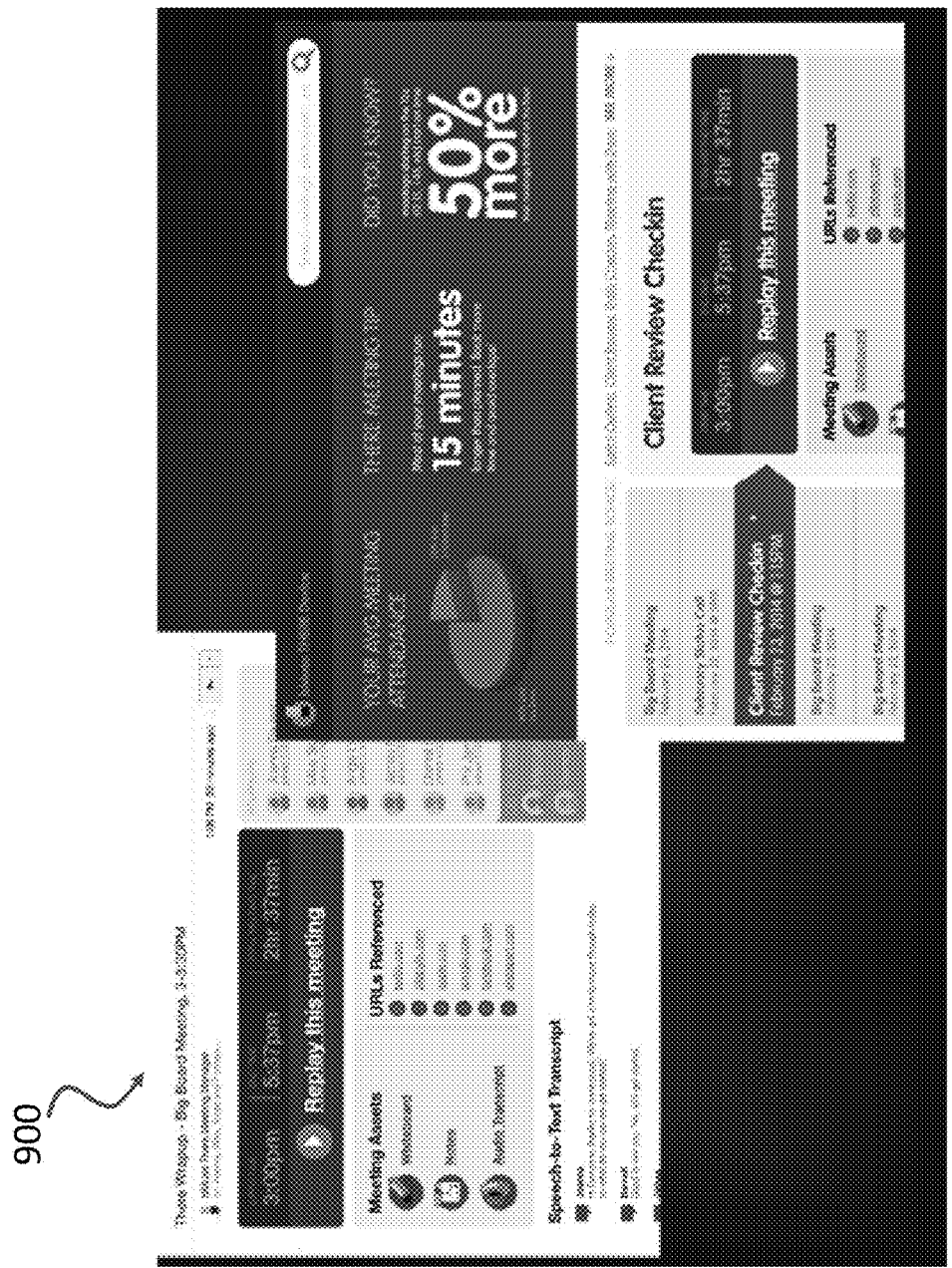
FIG. 9 illustrates an example display screen that is provided on a user computing device and that enables users to automatically receive meeting media and analytics associated with completed meetings, search meetings, as well as perform data analysis.

After a meeting ends, a number of "knowledge management" features can be provided one or more modules. For example, meeting participants are transmitted a meeting summary, which may include text, audio, video, statistics, and intelligence. The meeting summary may include a list of URLs for all the companies discussed in the meeting. In one or more implementations, the meeting summary can be sent to participants via e-mail (or other user-selectable communication tool). In one or more implementations, meeting content is searchable and an automated speech-to-text feature is included that converts audio content from the meeting to searchable text. Moreover, the present application supports a meeting dashboard. FIG. 9 illustrates an example display screen 900 that is provided, for example, on user computing device 104 and that enables a user to search previously held meetings, as well as perform data analysis, such as to look for trends. In the example shown in FIG. 9, controls are provided for a user to replay a meeting, access meeting assets, URL hyperlinks, and speech-to-text transcripts. For example, a law firm accessing the dashboard can search for all meetings in which Jane Smith testified as a witness.

In addition, as illustrated in FIG. 9, after a meeting is over, a wrap-up can be transmitted to all involved with notes, transcripts, links and assets. The dashboard provides a convenient view of a participant's history, easily allowing the participant to search for content from the past, and provide insights planning, attending, and running meetings.

Thus, as shown and described herein, a user's experience is customized and delivered, at least in part depending on what other devices are in the room, for example, via location awareness, as well as the screen size of the device. For instance, if a person is in a meeting and has a mobile device, that person does not need to see a video of the people in the meeting, because that person can see the other participants in person. The present application can be configured to be aware of each participant's respective location and to create a custom experience and efficient visual experience, and that reduces or eliminates redundancy.

Although the present application has been described in relation to particular implementations thereof, other variations and modifications and other uses are included herein. It is preferred, therefore, that the present invention not be limited by the specific disclosure herein.

The present application and apparatus allow a number of ways for personal identification and authentication of users in a seamless manner (without the need to ender codes/passwords). In one or more implementation the user is identified by his/her voice and the software includes a "face recognition" module. Credentials from the user mobile device are passed seamlessly to the main videoconferencing device, for instance via Bluetooth.

The present application and apparatus are capable of performing audio spatialization, both in transmitting and receiving mode, whereby the microphone arrays detect the relative positions of the persons speaking and the audio speakers (including the audio components embedded in the main device, and/or those remotely connected to the main device) are capable of rendering a spatial position of the rendered voice/sound.

The present application and apparatus are capable of performing a superior noise reduction (increasing signal-to-noise ratio) but a combination of beam forming (via the microphone arrays), voice texture recognition and face recognition.

The present application and apparatus are adapting transmitted data rate automatically by selecting the image of the person speaking.

What is claimed:

1. A system for providing an interactive telepresence, the system comprising:
   at least one data processing apparatus configured by executing code that is stored on non-transitory processor readable media;
   at least one database that is accessible by the at least one data processing apparatus, wherein the at least one database includes meeting information representing at least a meeting, a date of the meeting and a plurality of participants who are scheduled to attend the meeting;
   an audio/visual capture device that is configured with at least one microphone and camera and that is configured to communicate with the at least one data processing apparatus via a communication network;
   a detection module that is configured to detect, via audio input received by the audio/visual capture device, one of the plurality of participants who is speaking during the meeting; and
   a display module that is configured to display on at least one user computing device operated by at least one participant who is remotely located from the audio/visual capture device and/or a display device, video that is generated using output from the audio/visual capture device and that individually features the one of the plurality of participants,
   wherein the at least one data processing apparatus is further configured to:
      provide, via a user interface running on each of a plurality of computing devices respectively operated by a plurality of the participants, selectable representations of each of the participants;
      receive, from a first of two of the computing devices, a first selection of a representation of a participant; and
      receive, from a second of the two of the computing devices, a second selection of a representation of a participant; and
   wherein, in response to the received first and second selections, the display module is further configured to:
      display simultaneously on each of the first computing device and the second computing device, the respective participant represented by each of the first and second selections, wherein the detection module is further configured to: determine, as a function of location awareness technology, respective computing devices that are operated by participants who are not remotely located from the audio/visual capture device and at least one computing device that is operated by at least one participant who is remotely located from the audio/visual capture device; wherein the display module is further configured to: provide, as a function of determining the respective computing devices: a first customized graphical user interface running on the respective computing devices that are operated by participants who are not remotely located from the audio/visual capture device, wherein the first customized graphical user interface displays at least one participate who is remotely located from the audio/visual capture device and does not display at least one participant who is not remotely located from the audio/visual capture device; and a second different customized graphical user interface running on at least one computing device that is operated by at least one participant who is remotely located from the audio/visual capture device, wherein the second customized graphical user interface displays at least one participate who is not remotely located from the audio/visual capture device.

2. The system of claim 1, wherein the audio/visual capture device is further configured with at least one microprocessor that is configured as a function of the detection module, and at least one communication device that enables at the audio/visual capture device to send and receive content over the a communication network.

3. The system of claim 1, wherein the display module is further configured to display simultaneously, on at least one computing device operated by at least one participant who is remotely located from the audio/visual capture device, a plurality of the participants who are detected by the detection module to be engaged in a conversation.

4. The system of claim 1, further comprising:
   a content sharing module that is configured to receive, from at least one user computing device respectively operated by one of the participants, content, and
   wherein the display module is further configured to transmit the content received from the at least one user computing device for display on each of the user computing devices operated by the plurality of participants.

5. The system of claim 1, further comprising:
   a meeting prompt module that is configured to detect when a participant has joined the meeting, and further configured to transmit, to each respective computing device operated by participants who have not joined the meeting, a prompt to join the meeting.

6. The system of claim 1, further comprising:
an archive module that is configured to store an archive of the meeting after the meeting completes, and to transmit information associated with the archive to each of the plurality of participants.

7. The system of claim 6, further comprising an integration module provided with the archive module that is configured to integrate records associated with the archive with at least one productivity software application.

8. The system of claim 7, wherein the at least one productivity software application includes one or more of a customer relationship management application, a customer service software application, a notetaking software application, a project management software application and a file hosting service.

9. The system of claim 1, wherein the archive includes an audio recording of the meeting, hyperlinks to content that were shown or discussed during the meeting, and/or a text transcript of the meeting.

10. The system of claim 1, wherein the camera provides a 360 degree field of view and/or wherein the at least one microphone provides a 360 degree range.

11. The system of claim 1, further comprising a knowledge agent module that is configured to receive, via the audio/visual capture device, voice commands, and to execute instructions that are associated with voice commands and that are stored on the processor readable media for execution by the at least one processor.

12. The system of claim 11, wherein the at least one microphone is configured to provide beam forming functionality for at least one of selecting, focusing and zooming in the video.

13. The system of claim 1, wherein the at least one microphone includes an array of microphones.

14. The system of claim 1, further comprising:
a content sharing module that is configured to access content from at least one computing device, and
wherein the display module is further configured to transmit the content accessed from the at least one computing device for display on at least one of the user computing devices operated by the plurality of participants.

15. The system of claim 1, further comprising a smart agent module for providing functionality, including for knowledge management.

16. The system of claim 1, further comprising a single-touch input module that is configured to receive user input in the form of at least one single gesture.

17. A method for providing an interactive telepresence, the method comprising:
accessing, by at least one data processing apparatus configured by executing code that is stored on non-transitory processor readable media, at least one database, wherein the at least one database includes meeting information representing at least a meeting, a date of the meeting and a plurality of participants who are scheduled to attend the meeting;
communicating, with the at least one data processing apparatus via a communication network by an audio/visual capture device that is configured with at least one microphone and camera;
detecting, one of the plurality of participants who is speaking during the meeting via audio input received by the audio/visual capture device;
displaying video that is generated using output from the audio/visual capture device and that individually features the one of the plurality of participants on at least one user computing device operated by at least one participant who is remotely located from the audio/visual capture device and/or a display device;
providing, via a user interface running on each of a plurality of computing devices respectively operated by a plurality of the participants, selectable representations of each of the participants;
receiving, from a first of two of the computing devices, a first selection of a representation of a participant;
receiving, from a second of the two of the computing devices, a second selection of a representation of a participant; and
in response to the received first and second selection, displaying simultaneously on each of the first computing device and the second computing device, the respective participant represented by each of the first and second selections, determining, as a function of location awareness technology, respective computing devices that are operated by participants who are located within a close physical proximity of the audio/visual capture device and at least one computing device that is operated by at least one participant who is remotely located from the audio/visual capture device; providing, as a function of determining the respective computing devices: a first customized graphical user interface running on the respective computing devices that are operated by participants who are not remotely located from the audio/visual capture device, wherein the first customized graphical user interface displays at least one participate who is remotely located from the audio/visual capture device and does not display at least one participant who is not remotely located from the audio/visual capture device; and a second different customized graphical user interface running on at least one computing device that is operated by at least one participant who is remotely located from the audio/visual capture device, wherein the second customized graphical user interface displays at least one participate who is not remotely located from the audio/visual capture device.

18. The system of claim 1, further comprising:
a virtual keyboard module configured to receive input from a user, the virtual keyboard module configured to provide a laser projection that displays a keyboard and/or touchpad and that is responsive to user movement in connection therewith.

* * * * *